(No Model.)
P. J. HOSTETLER, O. C. BOWER & E. M. HOPWOOD.
CULTIVATOR.
No. 311,832. Patented Feb. 3, 1885.
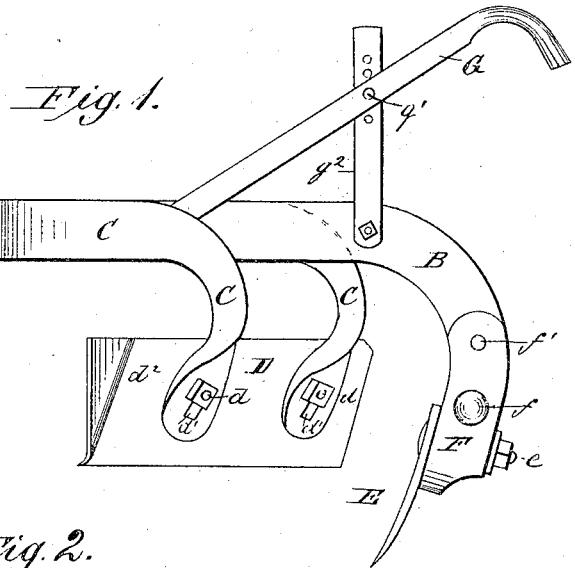
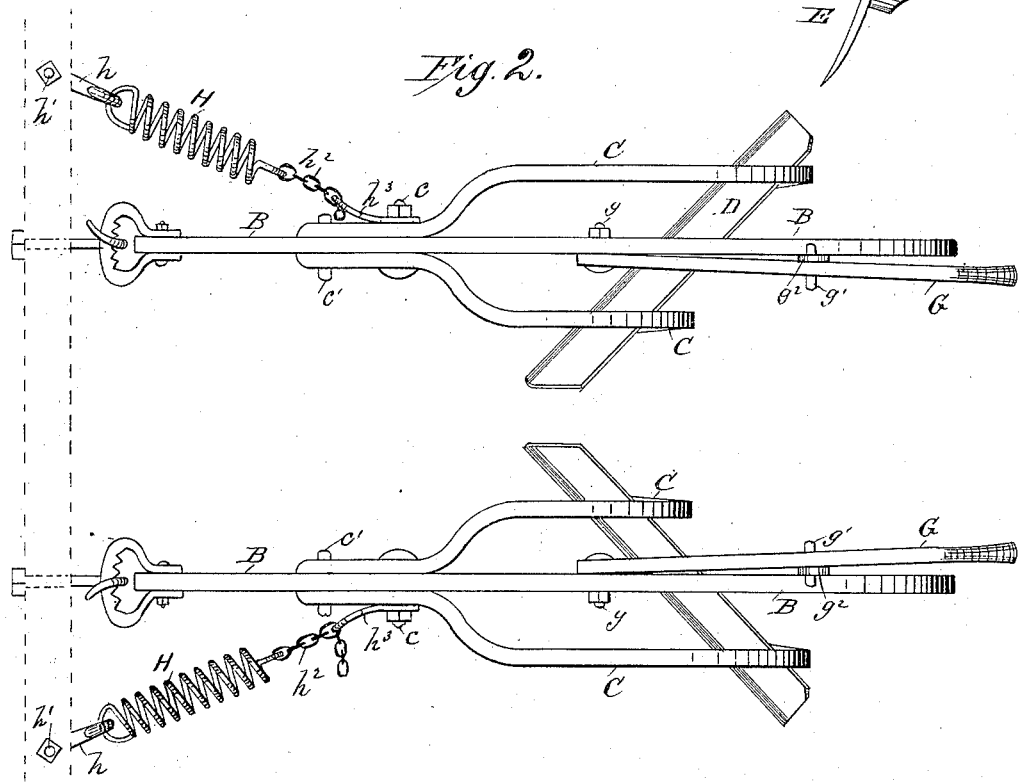
WITNESSES:
W. W. Hollingsworth
John C. Kemon
INVENTOR:
P. J. Hostetler
O. C. Bower
E. M. Hopwood
BY Munn
ATTORNEYS.

UNITED STATES PATENT OFFICE.

PETER J. HOSTETLER, OLIVER C. BOWER, AND ELIJAH M. HOPWOOD, OF BUSHTON, ILLINOIS.

CULTIVATOR.

SPECIFICATION forming part of Letters Patent No. 311,832, dated February 3, 1885.

Application filed August 25, 1884. (No model.)

*To all whom it may concern:*

Be it known that we, PETER J. HOSTETLER, OLIVER C. BOWER, and ELIJAH M. HOPWOOD, citizens of the United States, residing at Bushton, in the county of Coles and State of Illinois, have invented certain new and useful Improvements in Cultivators, of which the following is a description.

Figure 1 represents a side elevation of our improved cultivator. Fig. 2 is a plan view of the same.

The object of our invention is to construct a machine for scraping the ground and cultivating corn, sugar-cane, cotton, or other plants which are grown in rows in an improved manner, and so that such machine can be readily used in connection with the wheels and axle of any two-horse cultivator as commonly constructed, and easy of attachment thereto by means of the same couplings as commonly used.

In carrying out our invention we construct the cultivator in two separate portions, each of which consists of a central plow-beam with shorter beams attached to it for carrying the scraper, an adjustable handle for operating the machine, and an arrangement consisting of a coiled spring, chain, and hooks, which also attach the beams to the axle and counteract the inclination of the scraper to run inward toward the row of plants and injure them. The scrapers clean away all the weeds and rubbish between the rows. The edges coming next to them are turned up to form cutters, which shave the ground close up to the plants, and the rubbish is left in the middle of the rows between them by the outer edges of the scrapers. The plow can be regulated to any depth or turned toward the plants so as to heap up the moist clean earth against their roots.

We will now proceed to describe our invention with reference to the accompanying drawings, in which similar letters, where used in the different figures, indicate corresponding parts.

A is the axle of a two-horse cultivator-truck, (shown in dotted lines,) to which our improved cultivator is attached by couplings similar to those commonly used, and for which holes $a\ a$ are provided in the end of the central plow-beams, B.

C C are shorter beams attached to each central plow-beam, A, by the bolt C and the break-pin C', formed of wood and constituting a break-joint adapted to give way at the pin C' should the scraper meet with any serious obstruction.

D is the scraper, attached to the beams C C by bolts $d\ d$, which pass through the scraper-blade and through slots $d'\ d'$ in the end of beams C, so that the exact position of the scraper may be adjusted. The inner edge of the scraper is bent round at $d^2$ and forms a cutter.

E is the plowshare. This is not fastened directly to the plow-beam, but is attached to the central plow-beam by the bolt $f$ and the break-pin $f'$, formed of wood, and constituting a break-joint adapted to give way at the pin $f'$ should the plowshare meet with any serious obstruction. The lower portion of coupling-piece F forms a slot, through which the bolt $e$ passes and secures the plowshare E in position. This slot admits of the adjustment of said plowshare to suit the depth of cut required.

G is the handle to the central plow-beam, B, secured by the bolt $g$, on which it turns. $g'$ is a stop-pin for connecting the handle to the plate $g^2$. This plate is bolted to the beam B at its lower end, and is provided with a series of holes or a slot, so that the position of the handle G may be adjusted vertically and held by the pin $g'$ at the required height.

H is a coiled spring, one end of which is fastened to the axle A by the hook $h$ and bolt $h'$. The other end of spring H is secured to any convenient point on the beams by a short chain, $h^2$, and hook $h^3$, which is bolted to them. The short chain $h^2$ is for adjusting the tension of spring H, which counteracts the tendency of the scraper to run inward toward the row, and at the same time allows it to be moved easily toward or from the row by the handle G. Without this spring-connection the separate halves of which the cultivator is formed would be very difficult to handle.

Having thus described our invention, what we claim, and desire to secure by Letters Patent, is—

In a cultivator, the combination, with the plow-beams and the oblique scraper, of the spring H, provided with a hook and bolt for attaching it to the axle, the short chain $h^2$ for regulating the tension of said spring, and the hook $h^3$, bolted to the cultivator-beams, substantially as described, shown, and set forth.

PETER J. HOSTETLER.
OLIVER C. BOWER.
ELIJAH M. HOPWOOD.

Witnesses:
A. J. NEWMAN,
JOHN FAVORITE.